United States Patent
Puppala et al.

(10) Patent No.: US 10,405,135 B2
(45) Date of Patent: *Sep. 3, 2019

(54) TRACKING DEVICE OPERATION IN RISK-CLASSIFIED ZONE

(71) Applicant: Tile, Inc., San Mateo, CA (US)

(72) Inventors: Arunkumar Puppala, Fremont, CA (US); Liuyin Cheng, San Mateo, CA (US); Wayne Patterson, Burlingame, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,502

(22) Filed: Feb. 6, 2019

(65) Prior Publication Data

US 2019/0174260 A1    Jun. 6, 2019

Related U.S. Application Data

(63) Continuation of application No. 16/049,285, filed on Jul. 30, 2018, now Pat. No. 10,244,351, which is a
(Continued)

(51) Int. Cl.
*H04W 4/021* (2018.01)
*H04W 4/029* (2018.01)
(Continued)

(52) U.S. Cl.
CPC .......... *H04W 4/021* (2013.01); *G01S 5/0294* (2013.01); *H04W 4/029* (2018.02); *H04W 4/16* (2013.01);
(Continued)

(58) Field of Classification Search
CPC ....... H04W 4/029; H04W 4/023; H04W 4/00; H04W 4/80; H04W 4/70; H04W 4/04;
(Continued)

(56) References Cited

U.S. PATENT DOCUMENTS 5,731,757 A    3/1998  Layson, Jr.
6,774,797 B2   8/2004  Freathy et al.
(Continued)

OTHER PUBLICATIONS

International Search Report and Written Opinion, PCT Application No. PCT/US2018/044830, dated Nov. 15, 2018, 18 pages.
(Continued)

*Primary Examiner* — Meless N Zewdu
(74) *Attorney, Agent, or Firm* — Fenwick & West LLP

(57) ABSTRACT

Tracking devices can be associated with safe zones, smart zones, and high risk zones. Safe zones correspond to regions where a likelihood that a tracking device is lost within the safe zone is lower than outside the safe zone. High risk zones correspond to regions where a likelihood that a tracking device is lost within the high risk zone is higher than outside the high risk zone. Smart zones correspond to an expected tracking device, mobile device, or user behavior. Home areas are geographic regions in which a user resides, and travel areas are geographic regions in which a user does not reside. A tracking device can be configured to operate in a mode selected based on a presence of the tracking device within a safe zone, a smart zone, a high risk zone, a home area, or a travel area.

20 Claims, 9 Drawing Sheets

Related U.S. Application Data continuation of application No. 15/841,884, filed on Dec. 14, 2017, now Pat. No. 10,075,811.

(60) Provisional application No. 62/546,454, filed on Aug. 16, 2017.

(51) Int. Cl.

| | | |
|---|---|---|
| *H04W 4/16* | (2009.01) | |
| *G01S 5/02* | (2010.01) | |
| *H04W 4/23* | (2018.01) | |
| *H04W 4/18* | (2009.01) | |
| *H04W 8/16* | (2009.01) | |
| *H04W 4/02* | (2018.01) | |
| *H04W 8/12* | (2009.01) | |
| *H04W 4/38* | (2018.01) | |
| *H04W 8/10* | (2009.01) | |
| *H04W 8/00* | (2009.01) | |
| *H04W 8/14* | (2009.01) | |
| *H04W 48/04* | (2009.01) | |

(52) U.S. Cl.
CPC ............. *H04W 4/02* (2013.01); *H04W 4/185* (2013.01); *H04W 4/23* (2018.02); *H04W 4/38* (2018.02); *H04W 8/00* (2013.01); *H04W 8/10* (2013.01); *H04W 8/12* (2013.01); *H04W 8/14* (2013.01); *H04W 8/16* (2013.01); *H04W 48/04* (2013.01)

(58) Field of Classification Search
CPC ..... H04W 12/00; H04W 4/185; H04W 4/025; H04W 4/02; H04W 4/42; H04W 4/021; H04W 4/30; H04W 12/1206; H04W 12/12; H04W 88/02; H04W 88/08; H04W 88/10; H04W 88/06; H04W 88/00; H04W 12/00505; H04W 8/16; H04W 8/00; H04W 4/16; H04W 4/38; H04W 4/23; H04W 4/20; H04W 48/04; H04W 8/14; H04W 8/12; H04W 8/10; G01S 5/0294; G01S 5/02

See application file for complete search history.

(56) References Cited

U.S. PATENT DOCUMENTS

| | | | |
|---|---|---|---|
| 6,952,574 B2 | 10/2005 | Tealdi et al. | |
| 7,316,648 B2 | 1/2008 | Kelly et al. | |
| 7,825,794 B2 | 11/2010 | Janetis et al. | |
| 7,936,262 B2 | 5/2011 | Derrick et al. | |
| 7,961,092 B2 | 6/2011 | Freathy et al. | |
| 8,116,723 B2 | 2/2012 | Kaltsukis | |
| 8,217,791 B2 | 7/2012 | Grimm | |
| 8,334,769 B2 | 12/2012 | Freathy et al. | |
| 8,378,813 B2 | 2/2013 | Bannard | |
| 8,378,815 B1 | 2/2013 | McNulty et al. | |
| 8,493,219 B2 | 7/2013 | Buck et al. | |
| 8,548,489 B2 | 10/2013 | Iwamura et al. | |
| 8,981,924 B2 | 3/2015 | Yaqub et al. | |
| 9,019,984 B2 | 4/2015 | Grossman et al. | |
| 9,055,475 B2 | 6/2015 | Lacatus et al. | |
| 9,373,241 B2 | 6/2016 | Aninye et al. | |
| 9,423,487 B2 | 8/2016 | Buck, Jr. et al. | |
| 9,485,613 B2 | 11/2016 | Pan et al. | |
| 9,521,513 B2 | 12/2016 | McConathy et al. | |
| 9,549,286 B2 | 1/2017 | Birch et al. | |
| 9,606,238 B2 | 3/2017 | Carter | |
| 9,681,253 B2 | 6/2017 | Lyman et al. | |
| 9,686,743 B2 | 6/2017 | Lacatus et al. | |
| 9,786,146 B2 | 10/2017 | Markwell et al. | |
| 9,792,800 B2 | 10/2017 | Freathy | |
| 9,826,352 B2 | 11/2017 | Rabb | |
| 9,848,299 B1 | 12/2017 | Kumar et al. | |
| 9,854,385 B2* | 12/2017 | Oliver et al. | |
| 9,888,346 B2 | 2/2018 | Rabinowitz et al. | |
| 9,911,311 B1 | 3/2018 | Kumar et al. | |
| 9,922,531 B1 | 3/2018 | Doxey et al. | |
| 9,930,486 B2 | 3/2018 | Mycek et al. | |
| 9,964,623 B1 | 5/2018 | de la Broise et al. | |
| 9,990,823 B2* | 6/2018 | Batra et al. ......... | G08B 13/2462 |
| 10,002,515 B2 | 6/2018 | de Barros Chapiewski et al. | |
| 10,070,255 B1* | 9/2018 | Puppala et al. ....... | H04W 24/00 |
| 10,070,256 B1* | 9/2018 | Puppala et al. ....... | H04W 4/021 |
| 10,075,811 B1* | 9/2018 | Puppala et al. ....... | H04W 4/021 |
| 10,102,734 B2 | 10/2018 | Kumar et al. | |
| 10,117,052 B1* | 10/2018 | Puppala et al. ....... | H04W 4/021 |
| 10,176,699 B2 | 1/2019 | Doxey et al. | |
| 10,244,351 B2* | 3/2019 | Puppala et al. ....... | H04W 4/021 |
| 10,244,352 B2* | 3/2019 | Puppala et al. ....... | H04W 4/021 |
| 2004/0174264 A1 | 9/2004 | Reisman et al. | |
| 2004/0199056 A1 | 10/2004 | Husemann et al. | |
| 2005/0068169 A1 | 3/2005 | Copley et al. | |
| 2006/0268961 A1 | 11/2006 | Prestwich et al. | |
| 2007/0229350 A1 | 10/2007 | Scalisi et al. | |
| 2008/0088438 A1 | 4/2008 | Aninye et al. | |
| 2008/0143604 A1 | 6/2008 | Mock et al. | |
| 2008/0174422 A1 | 7/2008 | Freathy et al. | |
| 2012/0009943 A1 | 1/2012 | Greenberg | |
| 2012/0143397 A1 | 6/2012 | Mackay et al. | |
| 2012/0206296 A1 | 8/2012 | Wan | |
| 2012/0309413 A1 | 12/2012 | Grosman et al. | |
| 2013/0033375 A1 | 2/2013 | Doyle et al. | |
| 2013/0293378 A1 | 11/2013 | Aninye et al. | |
| 2014/0192712 A1 | 7/2014 | Li et al. | |
| 2014/0372154 A1 | 12/2014 | Scott | |
| 2015/0264647 A1* | 9/2015 | Lacatus et al. ... | H04W 52/0241 |
| 2015/0271655 A1 | 9/2015 | Jatavallabhula et al. | |
| 2015/0281890 A1 | 10/2015 | Chen et al. | |
| 2015/0350827 A1 | 12/2015 | Birch et al. | |
| 2015/0373506 A1 | 12/2015 | Jung et al. | |
| 2016/0112835 A1 | 4/2016 | McConathy et al. | |
| 2016/0180669 A1* | 6/2016 | Bradshaw et al. ......... G08B 13/2402 | |
| 2016/0192166 A1 | 6/2016 | deCharms | |
| 2016/0239794 A9* | 8/2016 | Shafer et al. ......... | G06Q 10/087 |
| 2016/0278159 A1 | 9/2016 | Ljung | |
| 2016/0343237 A1 | 11/2016 | Herman et al. | |
| 2017/0011616 A1* | 1/2017 | Britton et al. ....... | G08B 25/008 |
| 2017/0031358 A1 | 2/2017 | McHugh et al. | |
| 2017/0149795 A1 | 5/2017 | Day, II | |
| 2017/0303085 A1* | 10/2017 | Kennedy et al. ..... | H04W 4/023 |
| 2017/0332196 A1 | 11/2017 | Farley et al. | |
| 2017/0332330 A1* | 11/2017 | Dhandu et al. ... | H04W 52/0258 |
| 2018/0014250 A1 | 1/2018 | de Barros Chapiewski | |
| 2018/0042025 A1 | 2/2018 | Opshaug et al. | |
| 2018/0139575 A1 | 5/2018 | Rabinowitz et al. | |
| 2018/0176366 A1 | 6/2018 | Mukheree | |
| 2018/0184286 A1 | 6/2018 | Patterson | |
| 2018/0224517 A1* | 8/2018 | Ingerson et al. ...... | G01S 5/0027 |
| 2018/0329384 A1* | 11/2018 | Georgeson et al. . | G05B 19/048 |
| 2019/0018382 A1* | 1/2019 | Elkmann et al. .... | G05B 19/048 |
| 2019/0037431 A1 | 1/2019 | Martin et al. | |
| 2019/0116454 A1* | 4/2019 | Puppala et al. ....... | H04W 4/021 |

OTHER PUBLICATIONS

United States Office Action, U.S. Appl. No. 16/049,285, dated Aug. 29, 2018, 9 pages.

United States Office Action, U.S. Appl. No. 15/841,884, dated May 10, 2018, 8 pages.

* cited by examiner

TRACKING DEVICE OPERATION IN RISK-CLASSIFIED ZONE

CROSS REFERENCE TO RELATED APPLICATIONS

This application is a continuation of U.S. application Ser. No. 16/049,285, filed Jul. 30, 2018, now U.S. Pat. No. 10,244,351, which application is a continuation of U.S. application Ser. No. 15/841,884, filed Dec. 14, 2017, now U.S. Pat. No. 10,075,811, which application claims the benefit of U.S. Provisional Application No. 62/546,454, filed Aug. 16, 2017, all of which are incorporated by reference in their entirety.

BACKGROUND

This disclosure relates generally to tracking devices, and more specifically, to modifying the behavior of a tracking device or an associated mobile device based on its presence in a zone or an area.

Electronic tracking devices have created numerous ways for people to track the locations of people and/or objects. For example, a user can use GPS technology to track a device remotely or determine a location of the user. In another example, a user can attach a tracking device to an important object, such as keys or a wallet, and use the features of the tracking device to more quickly locate the object, (e.g., if it becomes lost).

Figure 1:
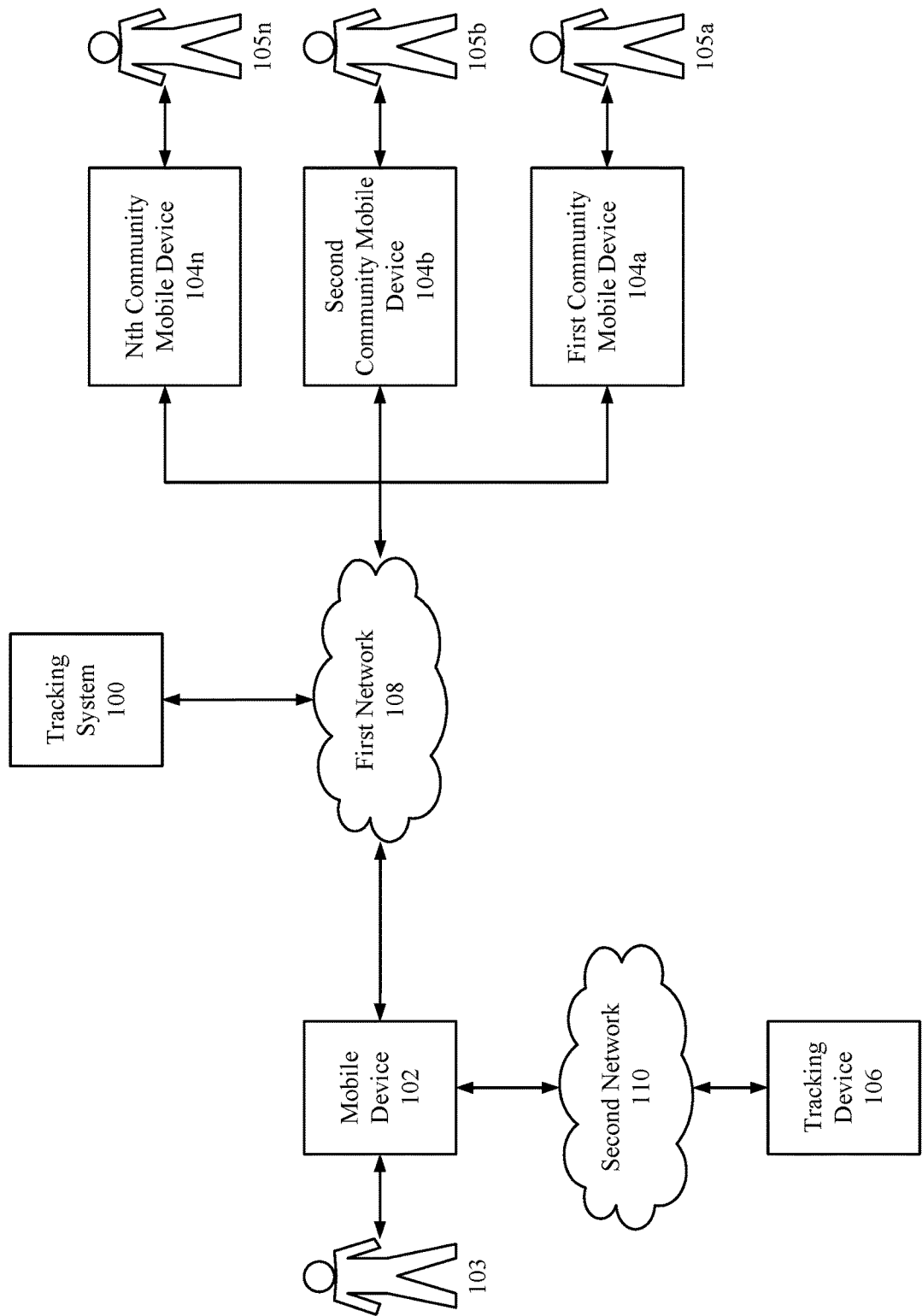
FIG. 1 illustrates an example tracking system environment in which a tracking device can operate, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a tracking device. A user can attach a tracking device to or enclose the tracking device within an object, such as a wallet, keys, a car, a bike, a pet, or any other object that the user wants to track. The user can then use a mobile device (e.g., by way of a software application installed on the mobile device) or other device or service to track the tracking device and corresponding object. For example, the mobile device can perform a local search for a tracking device attached to a near-by object. However, in situations where the user is unable to locate the tracking device using their own mobile device (e.g., if the tracking device is beyond a distance within which the mobile device and the tracking device can communicate), the user can leverage the capabilities of a community of users of a tracking device system.

In particular, a tracking system (also referred to herein as a "cloud server" or simply "server") can maintain user profiles associated with a plurality of users of the tracking device system. The tracking system can associate each user within the system with one or more tracking devices associated the user (e.g., tracking devices that the user has purchased and is using to track objects owned by the user). If the user's object becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device. As used herein, "mobile device" can refer to a phone, tablet computer, or other connected device, and can also refer to systems typically not consider mobile, such as servers, routers, gateways, access points, and specialized systems configured to couple to tracking devices and report a location of the tracking devices.

As used herein, "tracking device" can refer to any device configured to communicate with another device for the purpose of locating the tracking device. Tracking devices can be specialized or single-purpose devices (e.g., self-contained devices that include circuitry or components to communicate with another device). However, "tracking device" as used herein can also refer to device or object with a different primary function but with secondary tracking device functionality. For example, a suitcase can include tracking device components that allow a user to track and/or locate the suitcase. In some embodiments, a tracking device platform can be established such that devices and objects that satisfy one or more criteria can act as tracking devices within a tracking device ecosystem. For instance, a tracking device provider can provide an SDK or custom chipset that, when incorporated into an object or device, enable the object or device to function as tracking devices, to communicate with other devices within the tracking device ecosystem, and to implement the functionalities described herein.

FIG. 1 illustrates an example tracking system environment in which a tracking device can operate, according to one embodiment. The environment of FIG. 1 includes a tracking system 100 communicatively coupled to a mobile device 102 associated with the user 103 via a first network 108. The tracking system 100 is also communicatively coupled to a plurality of community mobile devices 104a through 104n (collectively referred to herein as "community mobile devices 104") associated with a plurality of users 105a through 105n of the tracking system 100 (collectively referred to herein as "community users 105") via the first network 108. As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. In such embodiments, the mobile device 102 and community mobile devices 104 may only be able to communicate with the tracking device 106 if they are within a close proximity to the tracking device, though in other embodiments, the tracking device can use long-distance communication functionality (for instance, a GSM transceiver) to communicate with either a mobile device 102/104 or the tracking system 100 at any distance. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal or other measure of proximity to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 105. For example, an implementation may include a first community mobile device 104a associated with a first community user 105a, a second community mobile device 104b associated with a second community user 105b, and additional communication mobile devices associated with additional community users up to an nth community mobile device 104n associated with an nth community user 105n. The community mobile devices 104 may also include functionality that enables each community mobile device 104 to identify a tracking device 106 within a proximity of the community mobile device 104. In one example, a first community mobile device 104a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may periodically transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. In some cases, the strength of signal or absence of a signal may be used to indicate that a tracking device 106 is lost.

System Overview

Figure 2:
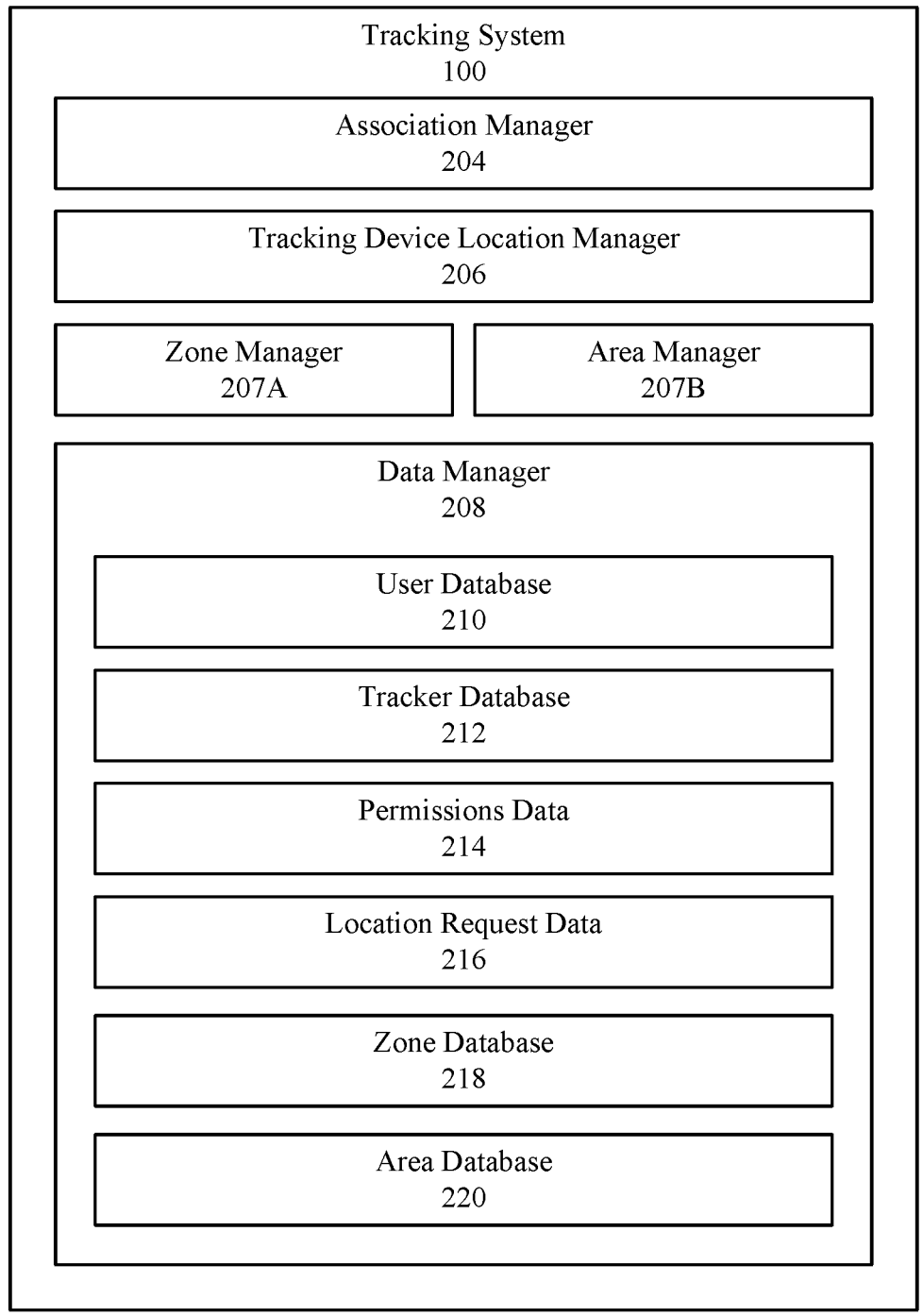
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, a zone manager 207A, an area manager 207B, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106.

The tracking device location manager 206 may also receive a location from one or more community mobile devices 104 that detect the tracking device 106, for instance in response to the community mobile device receiving a beacon signal transmitted by the tracking device 106, without the tracking device 106 having been previously marked as lost. In such embodiments, a user corresponding to the mobile device 102 can request a most recent location associated with the tracking device from the tracking system 100, and the location manager 206 can provide the location received from the community mobile device for display by the mobile device 102. In some embodiments, the location manager 206 provides the location of the tracking device 106 received from a community mobile device either automatically (for instance if the tracking device 106 is marked as lost) or at the request of a user of the mobile device 102 (for instance, via an application on the mobile device 102). The location manager 206 can provide a location of a tracking device 106 to a mobile device 102 via a text message, push notification, application notification, automated voice message, or any other suitable form of communication.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The zone manager 207A generates different types of zones based on a location dataset for one or more users. After generating a zone, the zone manager 207A stores the zone in the zone database. The generation and functionality of zones is described in further detail below with reference to FIG. 6. As described below, some types of zones (e.g., smart zones and safe zones) are specific to a user, whereas other types of zones (e.g., high-risk zones) are applicable to multiple users. In one embodiment, the zone manager 207A stores user-specific zones in the user database 210 in association with other data about the user, and the zone manager 207A stores zones that are applicable to multiple users in the zone database 218. In another embodiment, the zone manager 207A stores every generated zone in the zone database 218, but user-specific zones are stored with an identifier for the associated user.

The area manager 207B generates different types of areas and stores generated areas in the area database 220. The generation and functionality of areas is described in further detail below with reference to FIG. 7. As described below, areas may be user specific. Thus, similar to user-specific zones, user-specific areas may be stored in in the user database 210 in association with other data about the user, or they may be stored in the area database 220 with an identifier for the associated user.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, location request data 216, a zone database, and an area database 220. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate or receive a location of a tracking device 106. Location request data 216 may include information related to a location request or a lost indication received from the user 103 via a mobile device 102.

The data manger 208 may additionally include a zone database 218 and an area database 220. As described above, the zone database 218 may store zones generated by the zone manager 207A, and the area database 220 may store areas generated by the area manager 207B.

Figure 3:
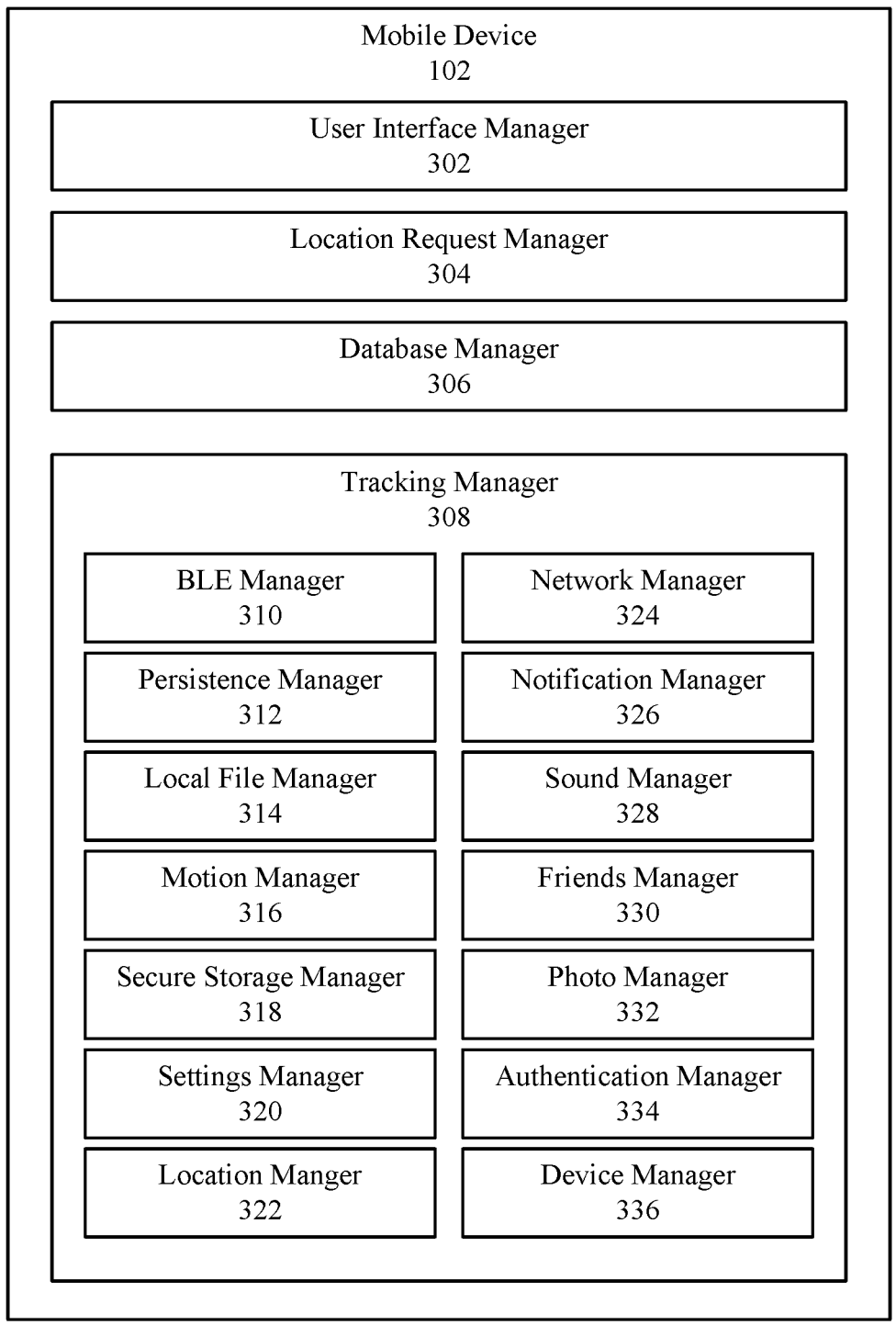
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100, and can display the most recent location via the user interface manager 302.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a tracking system 100 and/or a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
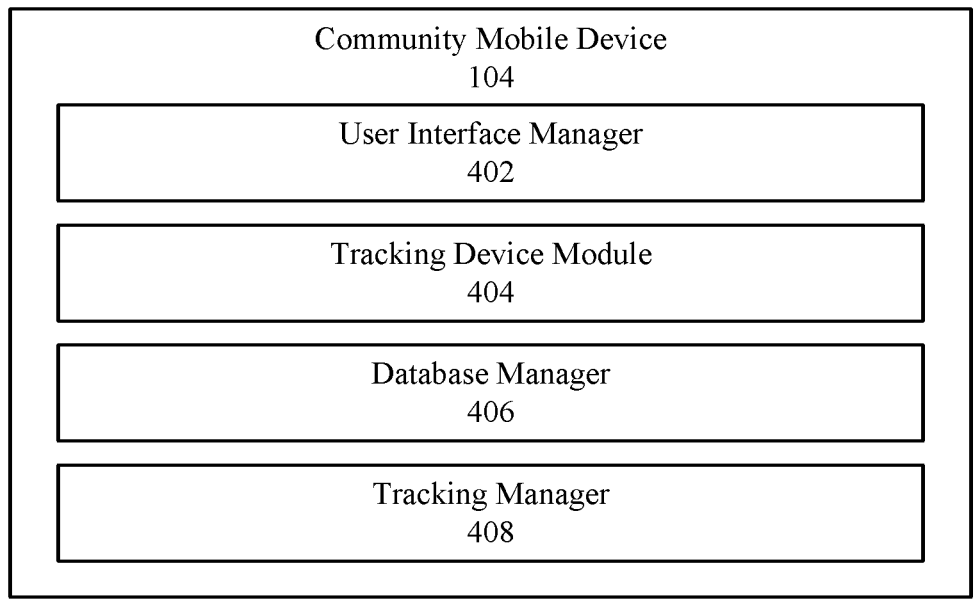
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated, and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may additionally provide other information to the tracking system 100 in response to receiving the tracking request. For example, in addition to providing a location of the community mobile device 104, the tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
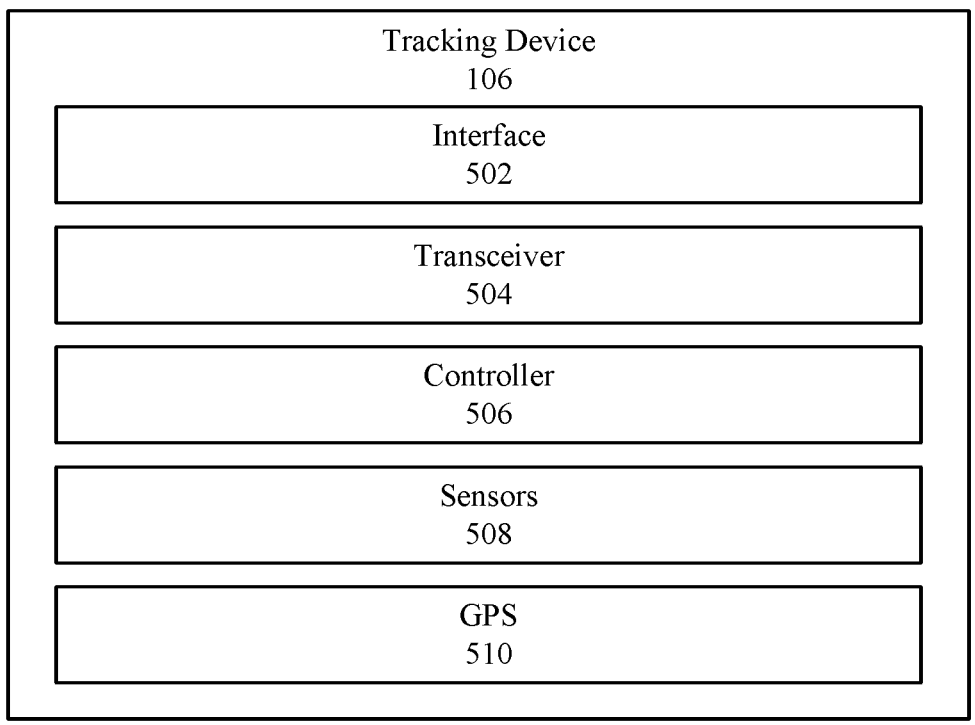
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a transceiver 504, a controller 506, one or more sensors 508, and a GPS unit 510. The transceiver 504 is a hardware circuit capable of both transmitting and receiving signals. It should be noted that in other embodiments, the tracking device 106 includes fewer, additional, or different components than those illustrated in FIG. 5. For instance, tracking devices might not include the GPS unit 510 and can still implement the functionalities described herein.

The interface 502 provides a communicative interface between the tracking device 106 and one or more other devices, such as a mobile device 102. For instance, the interface 502 can instruct the transceiver 504 to output beacon signals as described above (for example, periodically or in response to a triggering event, such as a detected movement of the tracking device 106). The interface 502 can, in response to the receiving of signals by the transceiver 504 from, for instance, the mobile device 102, manage a pairing protocol to establish a communicative connection between the tracking device 106 and the mobile device 102. As noted above, the pairing protocol can be a BLE connection, though in other embodiments, the interface 502 can manage other suitable wireless connection protocols (such as WiFi, Global System for Mobile Communications or GSM, and the like).

The controller 506 is a hardware chip that configures the tracking device 106 to perform one or more functions or to operate in one or operating modes or states. For instance, the controller 506 can configure the interval at which the transceiver broadcasts beacon signals, can authorize or prevent particular devices from pairing with the tracking device 106 based on information received from the devices and permissions stored at the tracking device, can increase or decrease the transmission strength of signals broadcasted by the transceiver, can configure the interface to emit a ringtone or flash an LED light, can enable or disable various tracking device sensors, can enable or disable a tracking device GPS unit, can enable or disable communicative functionality of the tracking device 106 (such as a GSM transmitter and receiving), can configure the tracking device into a sleep mode or awake mode, can configure the tracking device into a power saving mode, and the like. The controller 506 can configure the tracking device to perform functions or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device was configured to operate in a particular mode), based on information received from the sensors 508 or the GPS 510, or based on any other suitable criteria.

The sensors 508 can include motion sensors (such as gyroscopes or accelerators), altimeters, orientation sensors, proximity sensors, light sensors, or any other suitable sensor configured to detect an environment of the tracking device 106, a state of the tracking device 106, a movement or location of the tracking device 106, and the like. The sensors 508 are configured to provide information detected by the sensors to the controller 506. The GPS unit 510 is configured to detect a location of the tracking device 106 based on received GPS signals, and is configured to provide detected locations to the controller 506.

Modification of Tracking Behavior Based on Presence in Zones or Areas

Figure 6:
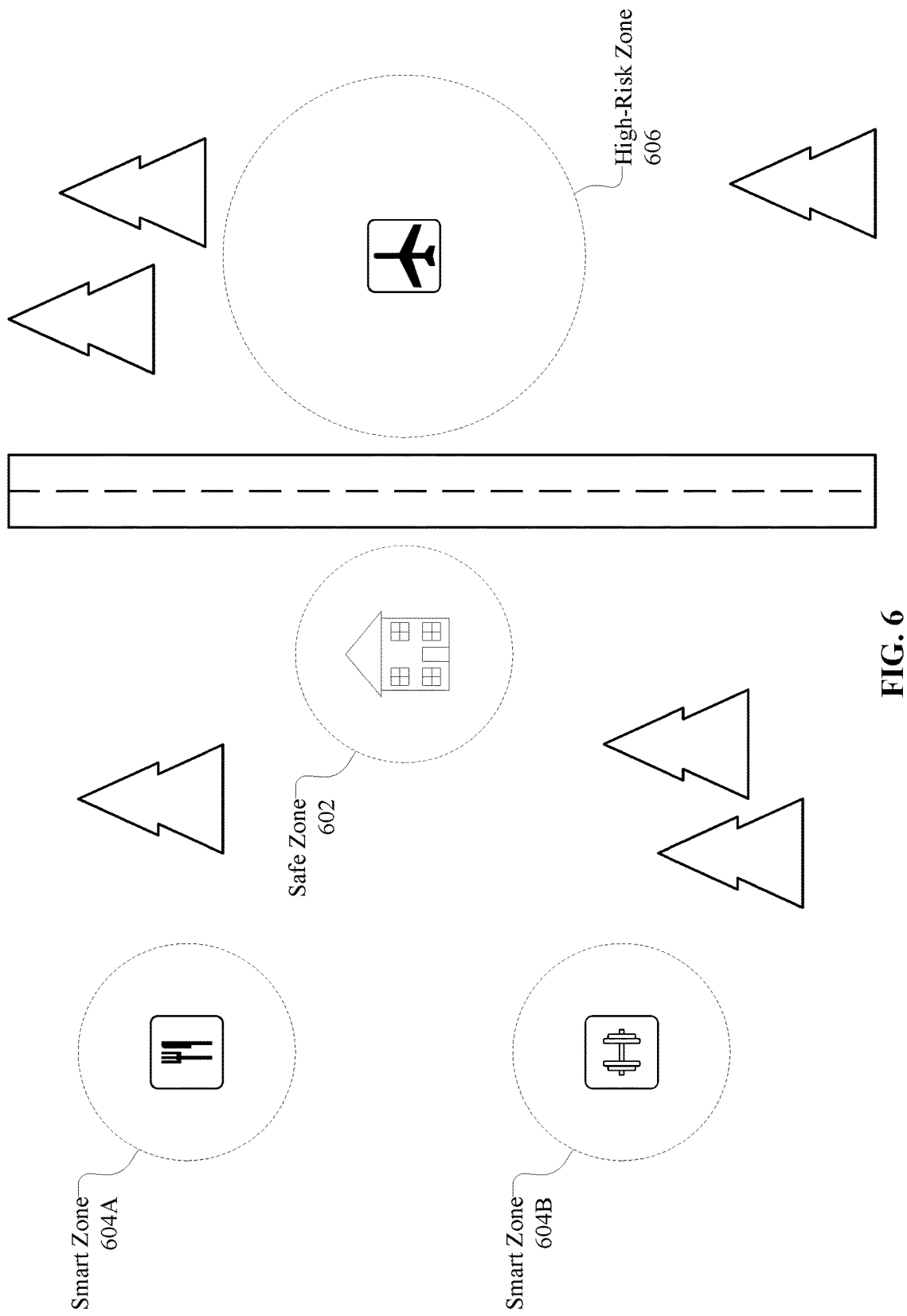
FIG. 6 illustrates a plurality of zones with associated behavior profiles that can affect the behavior of a tracking device or an associated mobile device, according to one embodiment.

FIG. 6 illustrates a plurality of zones 602, 604, 606 with associated behavior profiles that can affect the behavior of a tracking device or an associated mobile device, according to one embodiment. As referred to herein, a zone is a location in which an attached object has an expected behavior or a higher- or lower-than average probability of being lost or misplaced. An attached object refers to an object to which a tracking device 106 is attached. For example, an attached object may be a personal belonging that the user typically carries around with him or her, such as a set of keys, a portable electronic device (e.g., a smartphone, tablet computer, or laptop computer), a purse, or a wallet. An attached object may also be a personal belonging that is not necessarily carried around by the user on a day-to-day basis, such as a remote control or a pet. For clarity of description, the term "personal belonging" is used throughout this disclosure; when this term is used, it should be understood to refer to an object with a tracking device 106 attached to it.

Examples of three different types of zones 602, 604, 606 are illustrated in FIG. 6. A first type of zone is a safe zone 602. A safe zone is a location in which a user's probability of losing or misplacing a personal belonging is lower than average. For example, a user's home, workplace, or school may be designated as safe zones. In the example shown in FIG. 6, the user's house has been designated as a safe zone 602.

When one or more the user, the tracking device, or the mobile device are present in a safe zone 602 (e.g., as indicated by location tracking features of the mobile device 102), the behavior or configuration of the user's mobile device 102 and tracking device 106 may be modified to reflect a lower probability of losing personal belongings. For instance, after detecting the user's presence in safe zone 602, the mobile device 102 may automatically configure itself to scan for tracking device 106 less frequently. The mobile device 106 may also configure an attached tracking device 106 to enable power conservation features, such as reducing the power and frequency of the beacon signal transmitted by the tracking device 106, reducing the frequency at which the tracking device 106 automatically transitions from sleep mode to awake mode, or reducing the volume of a speaker of the tracking device 106. The modification of the behavior or configuration of a mobile device or tracking device when located within a safe zone is referred to herein as operation in a "safe zone mode".

A second type of zone is a smart zone 604. A smart zone 604 is a location in which a user and his or her personal belongings are expected to behave in a particular way. More particularly, a smart zone is a location in which the separation distance between the mobile device 102 (which is presumed to represent the location of the user) and a tracking device 106 (which is presumed to represent the location of one of the user's personal belongings) is expected to follow a particular pattern. For example, while the user is in a restaurant, the user may leave his or her belongings at the table when the user gets up to use the restroom or speak to a waiter. Thus, in a restaurant, a temporary increase in the separation distance between the mobile device and a tracking device is likely to be the result of normal user behavior rather than an indication that the user has lost or misplaced the object attached to the tracking device.

A smart zone 604 may be associated with a behavior profile that specifies parameters governing the operation of the tracking device 106 and the associated features of the mobile device 102 when the user is present in the corresponding smart zone 604. One parameter in the behavior profile can be, for example, the delay between detecting a disconnection of the tracking device 106 and providing a notification on the mobile device 102 that the tracking device 106 has been disconnected (hereinafter referred to as a notification delay time). Another parameter may be the threshold separation distance between the tracking device 106 and the mobile device 102 that causes the mobile device 102 to provide a notification to the user. For example, the mobile device 102 may determine a separation distance between the mobile device 102 and the tracking device 106 based on a strength of a signal received from the tracking device 106, and if the separation distance exceeds the threshold, then the mobile device 102 provides a notification to the user in the event that the user has left the attached object behind.

Parameters specified in a behavior profile may further include parameters governing the intensity of a notification provided by the mobile device 102 or the intensity of an alert provided by the tracking device 106. For example, the parameters may define various aspects of how a notification is provided on the mobile device 102, such as the volume of an audio alert, the intensity or pattern of a vibration, or whether to play an audio alert, a vibration, or both. Similarly, the parameters may define aspects of how the tracking device 106 provides an alert. For instance, a parameter may define the volume of an audio alert that the tracking device 106 plays back on a built-in speaker. As another example, the tracking device 106 may provide a visual alert by causing a light on the tracking device 106 to blink, and parameters may define the frequency or brightness of the visual alert.

A behavior profile may also include parameters for power conservation features of the tracking device 106, such as the power and frequency of the beacon signal transmitted by the tracking device 10, the frequency at which the tracking device 106 automatically transitions from sleep mode to awake mode, or the volume of a speaker of the tracking device 106. The behavior profile may also include parameters for features of the mobile device 102 or community mobile devices 104 in the smart zone, such as the frequency at which devices 102, 104 in the smart zone scan for nearby tracking devices 106, or whether to activate a search party function (e.g., configure community mobile devices 104 in the smart zone to scan for tracking devices 106 more frequently when a tracking device 106 is reported lost in the smart zone).

In one embodiment, the behavior profile for a smart zone is stored on the tracking system 100 (e.g., in association with the smart zone in the zone database 218, or in association with the user and the smart zone in the user database 210). Behavior profiles may additionally or alternatively be stored on the user's mobile device 102. For example, behavior profiles are stored on the tracking system 110, and the mobile device 102 maintains a cache containing copies of behavior profiles and associated smart zones for locations that the user frequently visits (e.g., more than a threshold number of times in a trailing time period, such as the preceding week or month).

A smart zone 604 may also be associated with a category representing the type of real-world location corresponding to the smart zone 604 (e.g., a restaurant, gym, church, etc.). For example, the smart zone 604A is categorized as a restaurant smart zone, and the smart zone 604B is categorized as a gym smart zone. An example process for generating smart zones and assigning categories to smart zones is described below with reference to FIG. 7A.

Each smart zone category may be associated with a behavior profile specifying parameters that reflect the expected behavior of users, mobile devices, or tracking devices in the corresponding type of location. For example, a restaurant behavior profile (e.g., for the restaurant smart zone 604A) specifies a notification delay time that relatively short, but greater than 0 minutes (e.g., between 15 and 30 minutes) as long as the location of the mobile device 102 remains inside the restaurant smart zone. As noted above, when dining at a restaurant, it is common for a user to leave his or her belongings at the table for short periods of time in order to use the restroom, visit a buffet, or speak to a waiter. Thus, a short but nonzero notification delay time in a restaurant smart zone prevents the mobile device 102 from providing unnecessary notifications that a tracking device 106 may have been lost when the user has simply left the table for a short period of time.

In one embodiment, the delay time for every restaurant is the same default value (e.g., between 15 and 30 minutes). In some embodiments, the delay time for a particular restaurant smart zone can be generated (or adjusted from the default value) based on tracking device data received from a plurality of users who have visited the restaurant. In one embodiment, the tracking system 100 computes an average disconnect-to-reconnect time for tracking devices 106 in the restaurant (e.g., an average length of time between a tracking device 106 disconnecting from a mobile device 102 and the tracking device 106 reconnecting to the mobile device) and generates the delay time for the restaurant smart zone based on the average disconnect-to-reconnect time (e.g., by multiplying the disconnect-to-reconnect time by a predetermined scale factor, such as 2.0). Because the average disconnect-to-reconnect time can represent the average time a user leaves the table, this method of generating the delay time can advantageously account for differences in user behavior between different restaurants. For example, users may leave their tables for longer periods of time at a buffet restaurant than at a restaurant with table service, and generating the delay time in this manner can account for such differences in behavior.

As another example, a gym behavior profile (e.g., for the gym smart zone 604B) specifies a relatively long notification delay time (e.g., 2 hours) to reflect the tendency of people to leave their personal belongings in a locker or in their car before operating exercise equipment in the gym. Thus, if a user brings his or her mobile device 102 into the gym (e.g., to listen to music while operating exercise equipment), a tracking device 106 attached to a personal belonging left in a car or locker is likely to become disconnected for the duration of the user's workout. Similar to the restaurant example provided above, the delay time for a particular restaurant gym zone can be generated (or adjusted from a default value) based on tracking device data received from a plurality of users who have visited the gym.

As a third example, a church behavior profile specifies a notification delay time of 0 minutes (i.e., a notification is provided on the mobile device 102 as soon as a tracking device 106 has been disconnected) because it is relatively uncommon for people attending church services to become separated from their personal belongings. To reduce disruption to church services, a church behavior profile may further specify lower intensity values for the notification provided by the mobile device 102 (e.g., lower audio volume, lower vibration intensity, shorter vibration length, or generating a vibration in place of an audio alert) or the intensity of an alert provided by the tracking device 106 (e.g., a lower volume for an audio alert that the tracking device 106 plays back on a built-in speaker) upon detecting that the tracking device 106 has been disconnected.

In each of the example smart zones described above, the mobile device 102 may be configured to immediately display a notification to the user if the mobile device 102 leaves the smart zone while a tracking device 106 is disconnected, even if the notification delay time has not elapsed, because this means the user has departed from the smart zone and has left a personal belonging behind. For example, if a mobile device 102 leaves the gym smart zone 604B after 15 minutes and the tracking device 106 attached to the user's house keys is not connected to the mobile device 102, then the mobile device 102 displays a notification even though the 2-hour delay period has not elapsed. The modification of the behavior or configuration of a mobile device or tracking device when located in a smart zone is referred to herein as operation in a "smart zone mode".

The tracking system 100 may also maintain an unclassified behavior profile that the tracking system 100 assigns to smart zones that are not associated with a category or to smart zones that are associated to a category that does not have a category-specific behavior profile. The unclassified behavior profile may specify a default notification delay time (e.g., 1 hour) but may also be configured to immediately display a notification to the user if the mobile device 102 leaves the smart zone while a tracking device 106 is disconnected.

A third type of zone is a high-risk zone 606. A high risk zone is a location in which a user has a higher-than-average probability of losing a personal belonging, such as an airport, train station, a concert venue, a sporting event, public transit, a store or other place of business, or a shopping mall. Similar to smart zones 604, a high-risk zone 606 may also be associated with a behavior profile that specifies parameters governing the operation of the tracking device 106 and the associated features of the mobile device 102 when the user is present in the corresponding high-risk zone 606. In general, a behavior profile for a high-risk zone may provide for more aggressive notifications, such as a shorter notification delay time (or a notification delay time of 0 minutes), higher-intensity notifications on the mobile device, greater transmission range for communications from the tracking device, a greater frequency of communications from the tracking device, and higher-intensity alerts on the tracking device.

High-risk zones can also be associated with a category representing a real world location, and each category can also be associated with a behavior profile specifying parameters that reflect the expected users in the corresponding type of location. For example, the high-risk zone 606 in FIG. 6 is an airport high-risk zone, and the tracking system 100 can define an airport behavior profile. In one embodiment, an airport behavior profile specifies a notification delay time of 0 minutes so that the mobile device 102 provides a notification as soon as a tracking device 106 is disconnected behavior of. Although this carries a risk of providing false positive notifications (i.e., providing a notification in a situation where a personal belonging has not actually been lost), the difficulty of recovering a lost item in an airport may be great enough to outweigh the inconvenience of providing false-positive notifications. An airport behavior profile may also specify a higher intensity for notifications provided on the mobile device 102 (e.g., higher volume, longer or more intense vibrations, a combination of vibration and audio alert) and for alerts provided on the tracking device 106 (e.g., a higher volume for audio alerts). An airport behavior profile may also configure the user's mobile device 102 to provide a notification when the separation distance of a tracking device 106 exceeds a threshold separation distance, such as 50 feet. This may be useful, for example, to alert the user when the user has left an item behind at a security checkpoint.

As another example, a behavior profile for a shopping mall may specify parameters that are more aggressive than average but less aggressive than an airport behavior profile because it is typically easier to recover lost personal belongings in a shopping mall than in an airport. For example, a shopping mall behavior profile may specify a notification delay time that is longer than 0 minutes but still relatively short (e.g., 5 to 10 minutes). The modification of the behavior or configuration of a mobile device or tracking device when present in a high risk zone is referred to herein as operation in a "high risk mode".

In some embodiments, different types of zones 602, 604, 606 can overlap. For example, a smart zone associated with a restaurant inside an airport terminal may overlap with a high-risk zone associated with the airport. As another, a safe zone associated with a user's home may overlap with a high-risk zone associated with an airport if the user lives near the airport. In one embodiment, a behavior profile associated with a safe zone is given higher priority than a behavior profile associated with a smart zone, which in turn is given higher priority than a behavior profile associated with a high-risk zone. Thus, if the mobile device 102 is in a location where a safe zone overlaps with a smart zone or a high-risk zone, the mobile device 102 and connected tracking device 106 are configured according to the behavior profile for the safe zone. Similarly, if the mobile device 102 is in a location where a smart zone overlaps with a high-risk zone, the mobile device 102 and connected tracking device 106 are configured according to the behavior profile for the smart zone.

In some embodiments, a tracking device or a mobile device, once configured to operate in a special mode described herein (such as a safe zone mode, a smart zone mode, or a high risk mode), can be configured to operate in the special mode until the passage of a threshold amount of time. In other embodiments, the tracking device or mobile device can be configured to operate in the special mode until the central tracking system provides an instruction to operate in a different mode, until the tracking device or mobile device moves out of a corresponding zone), until the tracking device or mobile device detects movement of any kind (for instance, using an accelerometer or other motion-detection component), or based on any other suitable criteria being satisfied.

It should be noted that geographic boundaries associated with each type of zone described herein (safe zones, smart zones, and high risk zones, in addition to types of areas) can be defined based on a number of criteria. In some embodiments, the geographic boundaries are retrieved from an external source, for instance a database of property lines, boundaries from a map database, a location database maintained by the central tracking system, and the like. For example, for an airport high risk zone, the geographic boundaries can be the boundaries of the airport as defined by Google Maps. In other embodiments, the boundaries can be determined based on historical location data retrieved from a population of tracking devices, based on historical location data for a particular tracking device, or can be user-defined.

Figure 7:
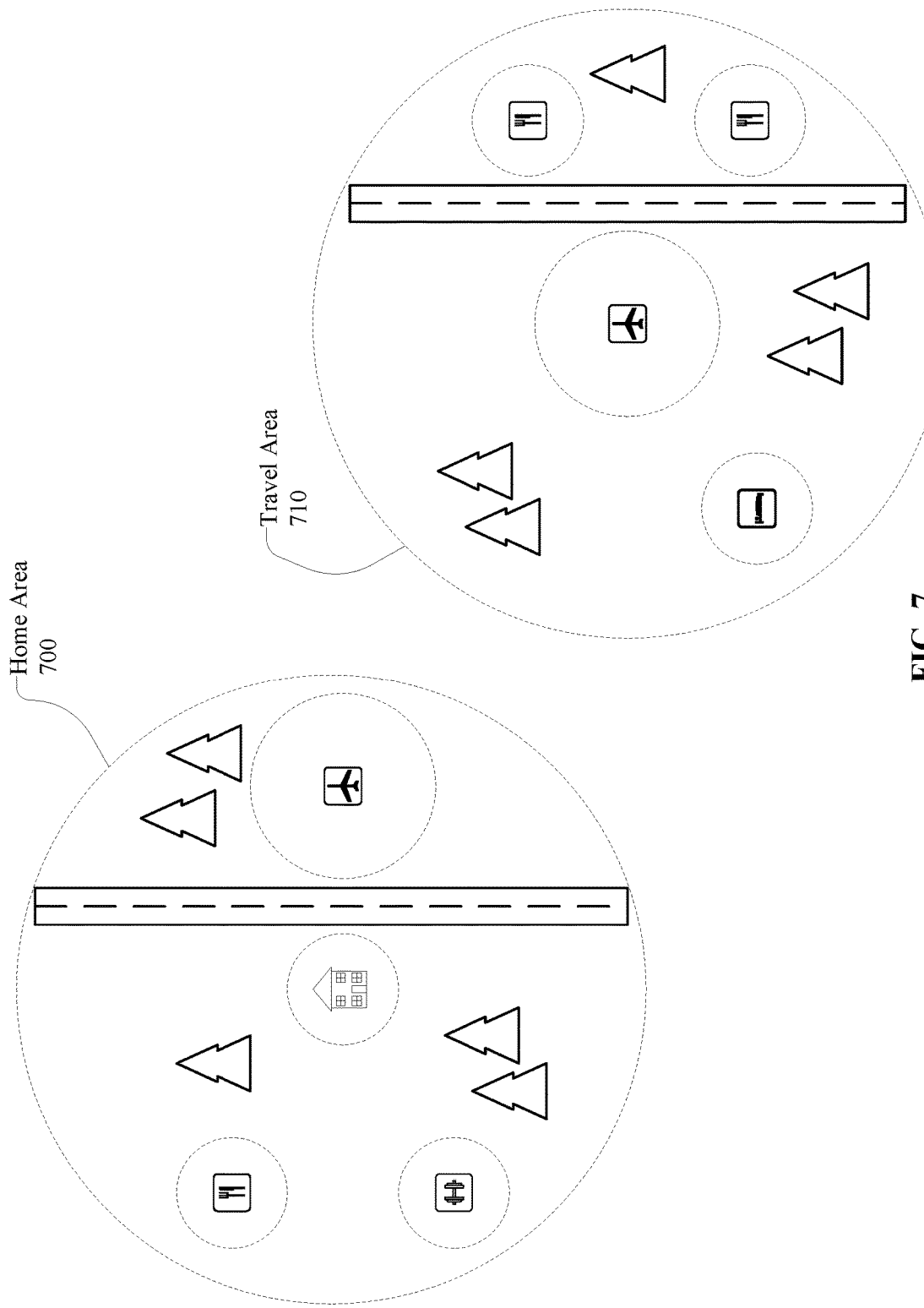
FIG. 7 illustrates a plurality of areas that each contain a plurality of zones, according to one embodiment.

FIG. 7 illustrates a plurality of areas that each contain a plurality of zones, according to one embodiment. As referred to herein, an area is a region in which is user is expected to be located for a given time period. The example shown in FIG. 7 includes two different types of areas: a home area 700 and a travel area 710.

A home area 700 is a geographic region in which the user resides. The tracking system 100 may generate the home area 700 for a user by drawing a circle of a predetermined radius (e.g., 50 miles) (or some other shape with predetermined dimensions) centered on the location of the user's home. In other embodiments, the home area 700 can be defined by the geographic boundary around the city, town, or neighborhood in which the user lives, or can be defined by the user. The user's home location may be provided as user input by the user, or the tracking system 100 may identify the user's home location by analyzing a location dataset for the user in the manner described below with reference to FIG. 8.

A travel area 710 is a geographic region in which the user is traveling. The tracking system 100 may generate a travel area 710 for a user based on the behavior of the user in a transit-related high-risk zone such as an airport, train station, or bus terminal. For example, if location information for the user (e.g., as recorded by the user's mobile device 102) indicates that the user has entered and then exited a transit-related high-risk zone outside of his or her home area 700, then the tracking system 100 generates a travel zone by drawing a circle of a predetermined radius (e.g., 50 miles) (or some other shape with predetermined dimensions) centered on the high-risk zone. The tracking system 100 may also generate a travel area based on the user's behavior at night when the user is outside of his or her home area. For example, if location information for the user indicates that the user's location remained stationary at a location associated with a hotel, then the tracking system generates a travel zone centered on the hotel. This method of generating a travel zone is advantageous, for example, because it can detect travel, such as a road trip, that does not involve passing through a transit-related high-risk zone such as an airport or train station. In an alternative embodiment, the tracking system 100 designates any geographic region beyond the user's home area as a travel area.

Each area is associated with a loss probability representing an overall probability that the user will lose a personal belonging while present in the area or an overall difficulty of recovering a personal belonging that has been lost in the area. In one embodiment, the tracking system 100 generates the loss probability when generating the area. The loss probability can be generated based on the type of area with which the loss probability is associated (e.g., a lower loss probability is generated for a home area than for a travel area). The loss probability can also be based on other factors, such as the number of tracking devices 106 that were reported to the tracking system 100 as lost in the area in a preceding time period (e.g., the preceding 60 days).

When a user is present in an area, the tracking system 100 can configure the user's mobile device 102 and tracking device 106 based on the loss probability associated with the area. In one embodiment, the loss probability is stored as a loss coefficient (e.g., a coefficient greater than 1.0 represents a higher-than-average loss probability and a coefficient less than 1.0 represents a lower-than-average loss probability), and parameters of behavior profiles for smart zones and high-risk zones inside the area are scaled by the loss coefficient. For example, the travel area 710 shown in FIG. 7 has a loss coefficient of 1.25 to reflect that fact that it is generally more difficult to recover a personal belonging that has been lost while the user is traveling. As a result, the tracking system 100 scales the parameters of the behavior profiles for smart zones in the travel area 710 by the loss coefficient. For example, the notification delay times for the two restaurant smart zones in the travel area are reduced by a factor of 1.25 (i.e., divided by 1.25) to provide for prompter notifications when a tracking device 106 is disconnected. Similarly, the intensity of notifications (e.g., the volume of an audio alert or the intensity or duration of a vibration alert) is increased by a factor of 1.25 to provide for more intense notifications within the travel area 710.

The tracking system 100 can also use the loss coefficient to modify the operation of the mobile device 102 and tracking device 106 independent of a behavior profile. For example, the default intensity of notifications provided on the mobile device 102 or alerts on the tracking device 106 is scaled by the loss coefficient when the user is present in the travel area 110. As another example, the intensity or frequency of the beacon signal broadcast by the tracking device 106 is scaled by the loss coefficient when the user is present in the travel area 110.

The tracking system 100 can also adjust other features of the tracking system 100, mobile device 102, or tracking device 106 based on the user's presence in an area. For example, if the user's mobile device 102 leaves the travel area 710 (e.g., when the user returns home from a vacation) but one of the user's tracking device 106 remains inside the travel area, then the tracking system 100 automatically designates the tracking device 106 as lost without receive a lost indication. In contrast, if the user's mobile device 102 leaves the home area 700 (e.g., when the user leaves home to go on a vacation) but one of the user's tracking device 106 remains inside the home area, then the tracking system 100 does not automatically designate the tracking device 106 as lost. Instead, the mobile device 102 may provide a notification to the user to alert the user that the object attached to the tracking device 106 has been left behind.

Figure 8:
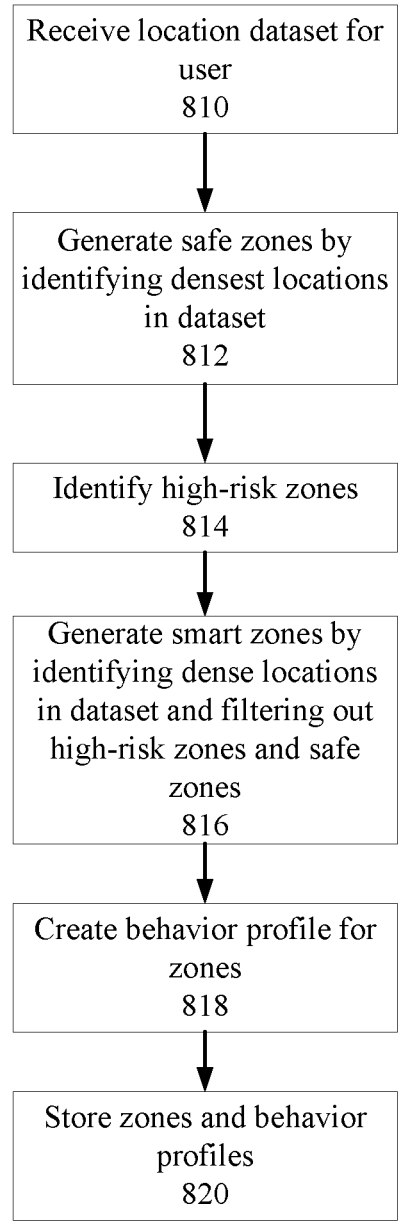
FIG. 8 is a flow chart illustrating a process for generating zones, according to one embodiment.

FIG. 8 is a flow chart illustrating a process 800 for generating zones, according to one embodiment. In other embodiments, the process 800 may include additional steps not shown in FIG. 8, and some of the steps in the process 800 may be omitted or performed in a different order. Although the description provided with reference to FIG. 8 states that the process 800 is performed on the tracking system 100, some or all of the steps in the process may alternatively be performed on the mobile device 102.

The tracking system 100 receives 810 a location dataset for the user. A location dataset comprises a set of time-stamped locations representing the places where the user has traveled during a trailing time window (e.g., the preceding 30 days or the preceding 60 days). As referred to herein, a location point is a single timestamped location (e.g., a latitude-longitude coordinate pair associated with a date and time), and the location dataset comprises a plurality of location points. In one embodiment, the location points are recorded by the user's mobile device 102 and sent to the tracking system 100. For example, a user's mobile device 102 is configured to periodically record the location of the mobile device 102 as indicated by a location tracking function on the mobile device 102 (e.g., a GPS receiver on the mobile device 102), and this location is presumed to represent the user. In one embodiment, the mobile device 102 provide privacy settings that allow the user to prevent the mobile device 102 from recording location points and/or sending the location points to the tracking system.

The tracking system 100 generates 812 safe zones by identifying the densest locations in the location dataset. In some embodiments, the tracking system 100 identifies the densest locations in the location dataset based on a clustering algorithm that groups densely connected location points into clusters. The tracking system 100 may perform the clustering algorithm on the entire location dataset or on a subset of the location points in the location dataset, such as the subset of location points in a shorter trailing time window. For example, the tracking system maintains a location dataset that includes location points from the preceding 60 days, and the clustering algorithm is performed on the location points from the preceding 30 days. The tracking 100 may also perform one or more data preprocessing and filtering steps on the location points before performing the clustering algorithm. For example, the tracking system 100 applies an accuracy filter to the location points to remove location points whose accuracy is less than a threshold (e.g., removing location points whose error is greater than ±65 meters).

The clustering algorithm may be configured to identify clusters that include a number of location points exceeding a clustering threshold, whereas groups that include a number of location points below the clustering threshold are not grouped into clusters and are instead identified as outliers. For example, the clustering threshold may be set to 50 location points, which means groups containing more 50 or more location points are joined into a cluster, whereas location points in groups containing fewer than 50 location points are identified as outliers. As another example, the clustering threshold may be set to 20 location points. In one embodiment, the clustering algorithm is a density-based spatial clustering of applications with noise (DBSCAN) algorithm.

After identifying the clusters, the tracking system 100 generates 812 safe zones at some or all of the clusters. In one embodiment, the tracking system 100 generates 812 a safe zone at each cluster identified by the clustering algorithm. In another embodiment, the tracking system 100 selects a subset of the clusters and generates 812 a safe zone at each selected cluster. For example, the tracking system 100 assigns a density value to each cluster (e.g., the density value may be the number of location points in the cluster). The tracking system 100 may then rank the clusters according to their density values and select the clusters whose ranking exceeds a threshold ranking (e.g., the five densest clusters) or select the clusters whose density value exceeds a threshold density value (e.g., the clusters having density value exceeding 75 location points). It should be noted that in some embodiments, safe zones are user defined, while in other embodiments, candidate safe zones are presented to a user for confirmation as safe zones. For instance, the tracking system 100 can generate a set of candidate safe zones based on the identified clusters, can suggest that a user affirmatively select one or more of the set of candidate safe zones, and can limit the generate safe zones to the selected candidate safe zones.

After generating 812 the safe zones, the tracking system 100 can categorize the safe zones. In one embodiment, the tracking system 100 categorizes a safe zone based on the timestamps of the location points in the safe zone. For example, a user's location tends to be the same as the location of his or her home between 12 AM and 6 AM (i.e., when the user is sleeping). Thus, if the timestamps of the location points in a particular safe zone include a large number of timestamps between 12 AM and 6 AM, then the safe zone may be categorized as the user's home safe zone. Similarly, a user's location tends to be the same as the location of his or her workplace between 9 AM and 5 PM, so if the timestamps of the location points in a particular safe zone include a large number of timestamps between those hours, then the safe zone may be categorized as the user's workplace safe zone.

The tracking system 100 identifies 814 high-risk zones in the region. As noted above, high-risk zones can be applicable to multiple users, whereas smart zones and safe zones may be specific to a single user. As a result, high-risk zones may be generated in a process independent of the process 800 shown in FIG. 8. In one embodiment, the process determines whether to identify a location based on the number of lost indications received at a location, the number of found indications received at the same location, and whether publicly available location or map data indicates that the location has a category that is part of a predetermined list of high-risk categories maintained on the tracking system 100 (e.g., an airport, helipad, airbase, train station, bus terminal, concert venue, shopping mall, etc.). For example, the process computes a found-to-lost ratio representing the ratio of found indications to lost indications at a location. If the ratio is less than a threshold (e.g., there are relatively few found indications relative to lost indications at the location), then the process determines whether the location has a high-risk category. If the location has both a ratio below the threshold and a high-risk category, then the tracking system 100 generates a high-risk zone at the location.

The tracking system 100 generates 816 smart zones by identifying dense locations in the location dataset and filtering out the high-risk zones and the safe zones. In one embodiment, the tracking system 100 performs the clustering algorithm a second time, but with a lower clustering threshold (e.g., the clustering threshold is set to 50 to generate 812 save zones and set to 20 to generate 816 smart zones), and then removes any clusters that have already been used to generate safe zones and any clusters at locations where a high-risk zone has been generated. The tracking system 100 then generates 816 smart zones at the clusters that were not removed.

In addition to a different clustering threshold, the tracking system 100 may also run the clustering algorithm on a different subset of the location dataset when generating 816 the smart zones. For example, the tracking system 100 provides location points from the preceding 30 days as input to the clustering algorithm when generating 812 the safe zones and provides location points from the preceding 60 days as input to the clustering algorithm when generating 816 the smart zones. The tracking system 100 may additionally perform one or more data preprocessing and filtering steps on the location points (e.g., removing location points whose accuracy is lower than a threshold) before performing the clustering algorithm to generate 816 the smart zones.

After generating 816 the smart zones, the tracking system 100 may classify some or all of the smart zones with a smart zone category (e.g., the restaurant smart zone, gym smart zone, and church smart zone as described above with reference to FIG. 6). For example, the tracking system 100 receives information about the location of the smart zone from a map database (e.g., via a call to the GOOGLE PLACES API) and classifies the smart zone based on the location information.

The tracking system 100 also generates a boundary for each smart zone. The boundary for a smart zone can be generated, for example, based on the locations of location points in the cluster (e.g., the boundary covers a larger area if the location points are farther apart from each other), a predetermined radius (e.g., the boundary is a circle with the predetermined radius and centered on the center of the cluster), property data (e.g., boundaries of the plot of land containing the location, according to map data), or an analysis of past users' behavior in at the location (e.g., the average amount of movement of users within the location, the average rate at which users enter and leave the location, etc.). In one embodiment, the tracking system 100 stores the boundary as a geofence. The tracking system 100 can also perform a similar process to generate boundaries for the safe zones generated 812 by the tracking system 100.

The tracking system 100 creates 818 behavior profiles for each of the generated zones. As noted above with reference to FIG. 6, the tracking system 100 can generate the parameters in the behavior profile for a smart zone based on the category of the smart zone and based on tracking device data received from a plurality of users who have visited the smart zone. The tracking system 100 may also create 818 behavior profiles for the safe zones.

The tracking system 100 stores 820 the created zones and behavior profiles. For example, the zones and behavior profiles are stored in the zone database 218 or in the user database 210 in association with the user's other data.

In addition to the process 800 described above, the tracking system 100 may also generate smart zones with other methods. In one embodiment, the tracking system 100 also performs a process that can generate a temporary smart zone for a public event such as an outdoor concert or a parade. For example, the tracking system 100 monitors public places where public events typically occur (e.g., the National Mall in Washington, D.C.) and creates a temporary smart zone in the public place when the number of people in the public place exceeds a threshold number. The threshold number can be determined based on an average number of people in the public place (e.g., the threshold number is three times the average number, so a temporary smart zone is created when three times as many people as average are in the public place. The tracking system 100 can determine the number of people in the public place, for example, based on location points received from mobile devices 102 in the public place over a relatively short trailing time window (e.g., the preceding hour). The tracking system 100 can additionally or alternatively generate a temporary smart zone based on publicly available information that provides a time and place for a public event or by user input from an operator of the tracking system 100 or a user of mobile device 102 in communication with the tracking system.

The tracking system 100 may also generate smart zones that are applicable to multiple users (similar to the high-risk zones described above) by combining location datasets for multiple users and providing the combined location dataset to the clustering algorithm described above. The tracking system 100 can then generate 816 the smart zones in the same manner as described above by performing the clustering algorithm to identify dense locations and then filtering out high-risk zones and safe zones. However, rather than filtering out the safe zones for a single user, the tracking system 100 filters out the safe zones for each of the multiple users whose location datasets were provided as input to the clustering algorithm.

Figure 9:
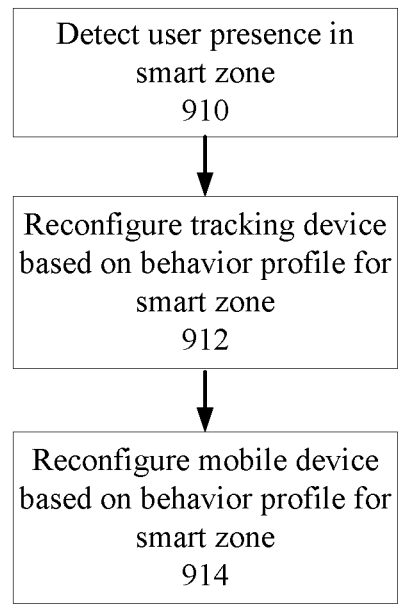
FIG. 9 is a flow chart illustrating a process for modifying tracking device behavior based on presence in a smart zone, according to one embodiment.

FIG. 9 is a flow chart illustrating a process 900 for modifying tracking device behavior based on presence in a smart zone, according to one embodiment. In other embodiments, the process 900 may include additional steps not shown in FIG. 8, and some of the steps in the process 900 may be omitted or performed in a different order.

The mobile device 102 detects 910 the user's presence in the smart zone. For example, location data from a location tracking feature on the mobile device 910 indicates that the mobile device 102 is inside a geofence that defines the boundaries of a smart zone. After detecting 910 the user's presence in the smart zone, the mobile device 102 accesses the behavior profile for the smart zone. For example, the mobile device 102 retrieves the behavior profile from the tracking system 100. As another example, the mobile device 102 maintains a local cache of behavior profiles for frequently visited smart zones, and the mobile device 102 accesses the behavior profile in the cache.

The mobile device 102 reconfigures 912 a connected tracking device 106 based on the behavior profile. For example, the behavior profile may specify parameters that change settings on the tracking device 106, such as the power and frequency of the beacon signal broadcast by the tracking device 106 or the volume of audio alerts emitted by a speaker on the tracking device 106, and the mobile device 102 reconfigures 912 the tracking device 106 by applying these settings. The mobile device 102 also reconfigures 914 itself based on the behavior profile. For example, the mobile device 102 adjusts its notification delay time to match the notification delay time specified in the behavior profile. The mobile device 102 may also adjust the intensity of the notifications that it provides based on parameters specified in the behavior model.

Figure 10:
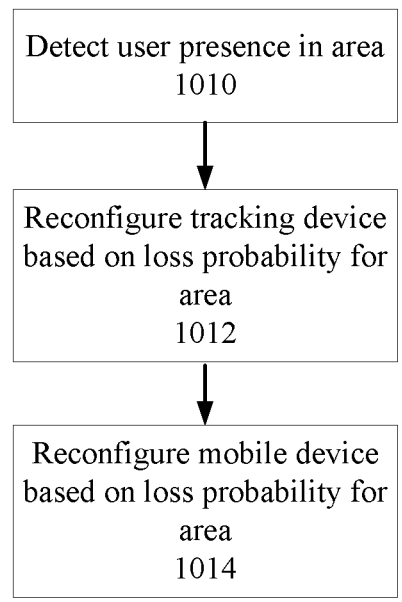
FIG. 10 is a flow chart illustrating a process for modifying tracking device behavior based on presence in an area, according to one embodiment.

FIG. 10 is a flow chart illustrating a process 1000 for modifying tracking device behavior based on presence in an area, according to one embodiment. In other embodiments, the process 1000 may include additional steps not shown in FIG. 8, and some of the steps in the process 1000 may be omitted or performed in a different order.

The mobile device 102 detects 1010 the user's presence in an area. For example, in an embodiment where the home area is defined as a circle centered on the user's home with a predetermined radius (e.g., 50 miles), then the mobile device 102 determines a distance between the location of the mobile device 102 and the location of the user's home. If the distance is less than the predetermined radius, then the mobile device 102 is inside the home area. Similarly, if a travel area is defined as a circle with a predetermined radius centered on a transit-related high-risk zone or a location associated with a hotel, the mobile device 102 determines that it is inside the travel area if the distance between the mobile device and the center of the travel area is less than the predetermined radius.

The mobile device 102 reconfigures 1012 a connected tracking device 106 based on the loss probability for the area. The mobile device 102 also reconfigures 1014 itself based on the loss probability for the area. For example, the mobile device 102 may modify its own settings or settings of the tracking device 106 based on a loss coefficient in the manner described above with reference to FIG. 7.

Although the steps of the processes 900, 1000 shown in FIGS. 9 and 10 are described as being performed on the mobile device 102, some or all of the steps of these processes 900, 1000 may alternatively be performed on the tracking system 100.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for locating a tracking device, comprising:
   receiving, by a central tracking system from a mobile device, a location of the tracking device, the mobile device configured to provide the location of the tracking device to the central tracking system in response to receiving a communication from the tracking device;
   in response to determining that the tracking device is located within a geographic boundary associated with a high risk zone, providing, by the central tracking system, an instruction to the mobile device to configure the tracking device to operate in a first operating mode, the mobile device configured to configure the tracking device to operate in the first operating mode in response to receiving the instruction; and
   in response to determining that the tracking device has left the geographic boundary associated with the high risk zone, providing, by the central tracking system, an instruction to the mobile device to configure the tracking device to operate in a second operating mode, the mobile device configured to configure the tracking device to operate in the second operating mode in response to receiving the instruction.

2. The method of claim 1, wherein the high risk zone is defined by an owner of the tracking device.

3. The method of claim 1, wherein the high risk zone is defined based on historical location data or behavior data of the tracking device.

4. The method of claim 1, wherein the high risk zone is one of a set of high risk zones, each associated with a corresponding geographic boundary.

5. The method of claim 1, wherein the high risk zone comprises a geographic area in which one or more other tracking devices were previously lost.

6. The method of claim 1, wherein the high risk zone comprises one of: an airport, a train station, a concert venue, a location associated with a sporting event, a location associated with public transit, a store, or a shopping mall.

7. The method of claim 1, wherein the location of the tracking device comprises a location of the mobile device when the mobile device receives the communication from the tracking device.

8. The method of claim 1, wherein the frequency of communication transmissions decreases when the tracking device switches from operating in the first operating mode to the second operating mode.

9. The method of claim 1, wherein the tracking device, when operating in the first operating mode, uses more power relative to the tracking device operating in the second operating mode.

10. The method of claim 1, wherein the tracking device, when operating in the first operating mode, transmits communications at a greater power than when operating in the second operating mode.

11. The method of claim 1, wherein the central tracking system is configured to classify the tracking device, when configured to operate in the first operating mode, as lost after a first threshold amount of time has passed without receiving any location of the tracking device, and wherein the central tracking system is configured to classify the tracking device, when configured to operate in the second operating mode, as lost after a second threshold amount of time longer than the first threshold amount of time has passed without receiving any location of the tracking device.

12. The method of claim 1, wherein a probability that the tracking device is lost when located within the high risk zone is great than when not located within the high risk zone.

13. A non-transitory computer-readable storage medium storing executable computer instructions that, when executed by a processor, perform steps for locating a tracking device comprising:
   receiving, by a central tracking system from a mobile device, a location of the tracking device, the mobile device configured to provide the location of the tracking device to the central tracking system in response to receiving a communication from the tracking device;
   in response to determining that the tracking device is located within a geographic boundary associated with a high risk zone, providing, by the central tracking system, an instruction to the mobile device to configure the tracking device to operate in a first operating mode, the mobile device configured to configure the tracking device to operate in the first operating mode in response to receiving the instruction; and
   in response to determining that the tracking device has left the geographic boundary associated with the high risk zone, providing, by the central tracking system, an instruction to the mobile device to configure the tracking device to operate in a second operating mode, the mobile device configured to configure the tracking device to operate in the second operating mode in response to receiving the instruction.

14. The non-transitory computer-readable storage medium of claim 13, wherein the high risk zone is defined by an owner of the tracking device.

15. The non-transitory computer-readable storage medium of claim 13, wherein the high risk zone is defined based on historical location data or behavior data of the tracking device.

16. The non-transitory computer-readable storage medium of claim 13, wherein the high risk zone comprises a geographic area in which one or more other tracking devices were previously lost.

17. The non-transitory computer-readable storage medium of claim 13, wherein the high risk zone comprises one of: an airport, a train station, a concert venue, a location associated with a sporting event, a location associated with public transit, a store, or a shopping mall.

18. The non-transitory computer-readable storage medium of claim 13, wherein the frequency of communication transmissions decreases when the tracking device switches from operating in the first operating mode to the second operating mode.

19. The non-transitory computer-readable storage medium of claim 13, wherein the tracking device, when operating in the first operating mode, uses more power relative to the tracking device operating in the second operating mode.

20. The non-transitory computer-readable storage medium of claim 13, wherein the tracking device, when operating in the first operating mode, transmits communications at a greater power than when operating in the second operating mode.

* * * * *